(12) United States Patent
Chen et al.

(10) Patent No.: US 12,376,130 B2
(45) Date of Patent: *Jul. 29, 2025

(54) METHOD FOR CONFIGURED GRANT CONFIGURATION, TERMINAL, AND NETWORK-SIDE DEVICE

(71) Applicant: VIVO MOBILE COMMUNICATION CO., LTD., Guangdong (CN)

(72) Inventors: Xiaohang Chen, Chang'an Dongguan (CN); Zhi Lu, Chang'an Dongguan (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/663,745

(22) Filed: May 14, 2024

(65) Prior Publication Data

US 2024/0298332 A1 Sep. 5, 2024

Related U.S. Application Data

(63) Continuation of application No. 17/353,174, filed on Jun. 21, 2021, now Pat. No. 12,004,175, which is a
(Continued)

(30) Foreign Application Priority Data

Dec. 25, 2018 (CN) .......................... 201811594238.6

(51) Int. Cl.
*H04W 72/23* (2023.01)
*H04L 5/00* (2006.01)
(Continued)

(52) U.S. Cl.
CPC .......... *H04W 72/23* (2023.01); *H04L 5/0051* (2013.01); *H04W 72/1263* (2013.01); *H04W 76/11* (2018.02)

(58) Field of Classification Search
CPC . H04W 72/23; H04W 72/1263; H04W 76/11; H04L 5/0051; H04L 5/0092;
(Continued)

(56) References Cited

U.S. PATENT DOCUMENTS

2012/0127934 A1 5/2012 Anderson
2015/0282208 A1 10/2015 Yi et al.
(Continued)

FOREIGN PATENT DOCUMENTS

CN 102118794 A 7/2011
CN 103329605 A 9/2013
(Continued)

OTHER PUBLICATIONS

ZTE R1-1813884: Enhancement for UL grant-free transmissions Nov. 2018 (Year: 2018).*
NTT DOCOMO, Inc., "Enhanced UL transmission with configured grant for URLLC", 3GPP TSG RAN WG1 Meeting #95, Nov. 12-16, 2018, R1-1813329.
VIVO, "Discussion on the enhancements to configured grants," 3GPP TSG RAN WG1 Meeting #95, Nov. 12-16, 2018, R1-1812303.
First Chinese Office Action for related Chinese Application No. 201811594238.6; reported Feb. 1, 2021.
(Continued)

*Primary Examiner* — Rina C Pancholi
(74) *Attorney, Agent, or Firm* — von Briesen & Roper, s.c.

(57) ABSTRACT

A method for configured grant configuration, a terminal, and a network-side device are provided. The method includes: receiving radio resource control (RRC) signalling transmitted by a network-side device, where the RRC signalling is used to configure a mapping relationship between a plurality of configured grant configuration sets and a plurality of indexes; receiving downlink control information (DCI) and determining, based on the mapping relationship, a configured grant configuration set corresponding to a target index that is indicated by the DCI; and deactivating configured grant configurations included in the configured grant configuration set that is determined.

18 Claims, 5 Drawing Sheets

Related U.S. Application Data continuation of application No. PCT/CN2019/110763, filed on Oct. 12, 2019.

(51) Int. Cl.
*H04W 72/1263* (2023.01)
*H04W 76/11* (2018.01)

(58) Field of Classification Search
CPC ... H04L 5/0044; H04L 5/0053; H04L 5/0098; Y02D 30/70
See application file for complete search history.

(56) References Cited

U.S. PATENT DOCUMENTS

| | | | |
|---|---|---|---|
| 2018/0048994 A1 | 2/2018 | Kwon et al. | |
| 2018/0199359 A1 | 7/2018 | Cao | |
| 2018/0279357 A1 | 9/2018 | Zacharias | |
| 2018/0288746 A1 | 10/2018 | Zhang | |
| 2018/0295651 A1 | 10/2018 | Cao | |
| 2019/0320469 A1* | 10/2019 | Huang | H04W 74/0833 |
| 2021/0219333 A1* | 7/2021 | Xu | H04W 72/0453 |
| 2022/0007411 A1 | 1/2022 | Takeda et al. | |

FOREIGN PATENT DOCUMENTS

| | | |
|---|---|---|
| CN | 104780544 A | 7/2015 |
| CN | 106160968 A | 11/2016 |
| CN | 108633005 A | 10/2018 |
| CN | 108882371 A | 11/2018 |
| WO | 2020090093 A1 | 5/2020 |

OTHER PUBLICATIONS

International Preliminary Report on Patentability PCT/CN2019/110763; reported Jul. 8, 2021.
Second Chinese Office Action for related Chinese Application No. 201811594238.6; reported Aug. 19, 2021.
Extended European Search Report for related Application No. 19903797.9; reported on Jan. 21, 2022.
Indian Examination Report for related Application No. 202127029917; reported on Mar. 3, 2022.
VIVO, "Remaining issues on UL data transmission procedure", Jan. 22-26, 2018, 3GPP TSG RAN WG1 Meeting AH 1801, Vancouver, Canada, R1-1800204.
Huawei, Hisilicon, "Enhanced UL configured grant transmissions", Nov. 12-16, 2018, 3GPP TSG RAN WG1 Meeting #95, Spokane, USA, R1-1812226.
ZTE, "Enhancement for UL grant-free transmissions", Nov. 12-16, 2018, 3GPP TSG WG1 Meeting #95, Spokane, USA, R1-1813884.
Japanese Notice of Reasons for Refusal for related Application No. 2021-537880; reported on Jun. 21, 2022.
VIVO, "Enhanced UL grant-free transmission for URLLLC", Jan. 21-25, 2019, 3GPP TSG RAN WG1 Ad-Hoc Meeting 1901, Taipei, R1-1900132.
First Singapore Office Action related to Application 11202106790U; reported on Jul. 14, 2023.
International Search Report & Written Opinion related to Application PCT/CN2019/110763; reported on Jan. 8, 2020.
First U.S. Office Action related to U.S. Appl. No. 17/353,174; reported on Oct. 5, 2023.

* cited by examiner

METHOD FOR CONFIGURED GRANT CONFIGURATION, TERMINAL, AND NETWORK-SIDE DEVICE

CROSS-REFERENCE TO RELATED APPLICATIONS

This application claims the benefit of and is a continuation application of U.S. patent application Ser. No. 17/353,174 filed on Jun. 21, 2021. U.S. patent application Ser. No. 17/353,174 is continuation application of PCT International Application No. PCT/CN2019/110763 filed on Oct. 12, 2019. PCT International Application No. PCT/CN2019/110763 claims priority to Chinese Patent Application No. 201811594238.6, filed in China on Dec. 25, 2018. Each of the above-listed applications is incorporated herein by reference in its entirety.

TECHNICAL FIELD

This disclosure relates to the field of communications technologies, and in particular, to a method for configured grant configuration, a terminal, and a network-side device.

BACKGROUND

Compared with previous mobile communications systems, a future 5G mobile communications system needs to be adapted to more diverse scenarios and service requirements. Main scenarios of 5G include enhanced mobile bandwidth (eMBB), ultra-reliable and low-latency communication (URLLC), and massive machine type communication (mMTC). These scenarios requires the system to provide high reliability, low latency, large bandwidth, and wide coverage. In order to reduce overheads for downlink control signalling for a periodic service with a fixed packet size, a network may employ semi-persistent scheduling to allocate a part of resources persistently for transmission of the periodic service.

For low-latency service or periodic service requirements, new radio (NR) supports a transmission mode with configured uplink grants to reduce signalling exchange procedures and ensure low-latency requirements. Resources for configured grant transmission may be semi-persistently configured by using radio resource control (RRC) signalling, and when data of a higher-priority service such as a URLLC service arrives, a terminal may transmit the data on a scheduling granted uplink channel (for example, a physical uplink shared channel Physical Uplink Shared Channel, PUSCH).

Configured grant transmissions fall into two types: type 1 (type 1) and type 2. The type 1 configured grant transmission is characterized in that all transmission parameters are configured by using RRC signaling; and once a type 1 configured grant is configured in RRC, the configuration is activated. The type 2 configured grant transmission is characterized in that part of parameters, for example, periodic parameters, are configured by using RRC and a type 2 configured grant configuration needs to be activated by downlink activation signalling.

In the related art, when the network configures a plurality of configured grant configurations for the terminal, the network usually needs to transmit activation or deactivation signalling for each configured grant configuration, thereby increasing signalling overheads to some extent and also leading to increasing power consumption of the terminal.

SUMMARY

A method for configured grant configuration is provided, applied to a terminal and including:

obtaining a mapping relationship between a plurality of configured grant configuration sets and a plurality of indexes, where the configured grant configuration set includes at least one configured grant configuration;
receiving downlink control information (DCI) and determining, based on the mapping relationship, a configured grant configuration set corresponding to a target index that is indicated by the DCI, where the target index is any one of the plurality of indexes; and
activating or deactivating a configured grant configuration included in the configured grant configuration set that is determined.

An embodiment of this disclosure further provides a method for configured grant configuration, applied to a network-side device and including:

configuring, for a terminal, a mapping relationship between a plurality of configured grant configuration sets and a plurality of indexes, where the configured grant configuration set includes at least one configured grant configuration; and
transmitting downlink control information (DCI) to the terminal, where the DCI is used to indicate a target index, so that the terminal activates or deactivates a configured grant configuration included in the configured grant configuration set and corresponding to the target index, where the target index is any one of the plurality of indexes.

An embodiment of this disclosure further provides a terminal, including:

an obtaining module, configured to obtain a mapping relationship between a plurality of configured grant configuration sets and a plurality of indexes, where the configured grant configuration set includes at least one configured grant configuration;
a determining module, configured to receive downlink control information (DCI) and determine, based on the mapping relationship, a configured grant configuration set corresponding to a target index that is indicated by the DCI, where the target index is any one of the plurality of indexes; and
an activation or deactivation module, configured to activate or deactivate a configured grant configuration included in the configured grant configuration set that is determined.

An embodiment of this disclosure further provides a terminal, including a processor, a memory, and a computer program stored in the memory and capable of running on the processor. When the computer program is executed by the processor, the steps of the foregoing method for configured grant configuration are implemented.

An embodiment of this disclosure further provides a network-side device, including:

a first configuring module, configured to configure, for a terminal, a mapping relationship between a plurality of configured grant configuration sets and a plurality of indexes, where the configured grant configuration set includes at least one configured grant configuration; and
a first transmitting module, configured to transmit downlink control information (DCI) to the terminal, where the DCI is used to indicate a target index, so that the terminal activates or deactivates a configured grant configuration included in the configured grant configuration set and corresponding to the target index, where the target index is any one of the plurality of indexes.

An embodiment of this disclosure further provides a network-side device, including a processor, a memory, and a computer program stored in the memory and capable of running on the processor. When the computer program is executed by the processor, the steps of the foregoing method for configured grant configuration are implemented.

An embodiment of this disclosure further provides a computer-readable storage medium, where a computer program is stored in the computer-readable storage medium, and when the computer program is executed by a processor, the steps of the foregoing method for configured grant configuration are implemented.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may derive other drawings from these accompanying drawings.

DESCRIPTION OF EMBODIMENTS

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure shall fall within the protection scope of this disclosure.

In the embodiments of this disclosure, terms such as "an example" or "for example" are used to represent examples, illustrations, or explanations. Any embodiment or design solution described as "an example" or "for example" in the embodiments of this disclosure should not be construed as preferred or advantageous over other embodiments or design solutions. To be precise, the words such as "an example" or "for example" are intended to present a related concept in a specific manner.

Figure 1:
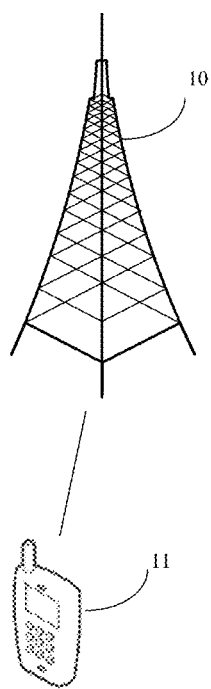
FIG. 1 is a schematic architectural diagram of a wireless communications system according to an embodiment of this disclosure.

The following describes the embodiments of this disclosure with reference to the accompanying drawings. A method for configured grant configuration, a terminal, and a network-side device provided in the embodiments of this disclosure may be applied to a wireless communications system. The wireless communications system may be a 5G system, or an evolved long term evolution (eLTE) system, or a subsequent evolved communications system. FIG. 1 is a schematic architectural diagram of a wireless communications system according to an embodiment of this disclosure. As shown in FIG. 1, the wireless communication system may include: a network-side device 10 and a terminal (the terminal may also be referred to as a user-side device). For example, the terminal is denoted as UE 11, and the UE 11 may be connected to the network-side device 10. In an actual application, connection between the foregoing devices may be wireless connection. To conveniently and visually represent a connection relationship between the devices, a solid line is used in FIG. 1.

It should be noted that the communications system may include a plurality of UEs, and the network-side device may communicate (for transmission of signalling or data) with the plurality of UEs.

The network-side device 10 provided in this embodiment of this disclosure may be a base station. The base station may be a commonly used base station, or may be an evolved node base station (eNB), or may be a device such as a network-side device (for example, a next generation base station (gNB)), a transmission and reception point (TRP), or a cell in a 5G system.

The terminal provided in this embodiment of this disclosure may be a mobile phone, a tablet computer, a notebook computer, an ultra-mobile personal computer (UMPC), a netbook, a wearable device, an in-vehicle device, a personal digital assistant (PDA), or the like. It should be noted that a specific type of the terminal is not limited in the embodiments of this disclosure.

Figure 2:
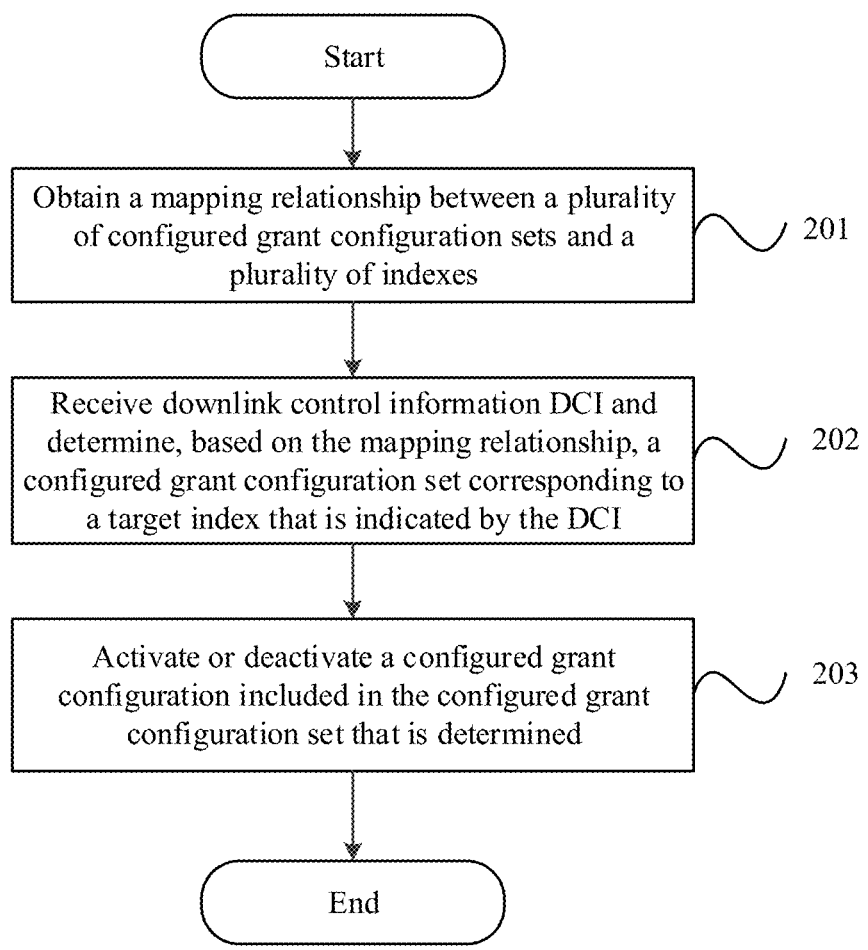
FIG. 2 is a flowchart 1 of steps of a method for configured grant configuration according to an embodiment of this disclosure.

As shown in FIG. 2, an embodiment of this disclosure provides a method for configured grant configuration, applied to a terminal and including the following steps.

Step 201: Obtain a mapping relationship between a plurality of configured grant configuration sets and a plurality of indexes, where the configured grant configuration set includes at least one configured grant configuration.

For example, in one mapping relationship, a configured grant configuration set 1 corresponds to an index 1, a configured grant configuration set 2 corresponds to an index 2, a configured grant configuration set 3 corresponds to an index 3, and a configured grant configuration set 4 corresponds to an index 4. For another example, in another mapping relationship, a configured grant configuration set 5 corresponds to an index 1, a configured grant configuration set 6 corresponds to an index 2, a configured grant configuration set 7 corresponds to an index 3, and a configured grant configuration set 8 corresponds to an index 4.

The foregoing index is used in the DCI to indicate a configured grant configuration set having a mapping relationship with the index.

It should be noted that the plurality of configured grant configuration sets included in different mapping relationships described above may be identical or different; similarly, the plurality of indexes included in the different mapping relationships described above may be identical or different. Examples are not described one by one herein.

Step 202: Receive downlink control information (DCI) and determine, based on the mapping relationship, a configured grant configuration set corresponding to a target index that is indicated by the DCI, where the target index is any one of the plurality of indexes.

In this step, if only one mapping relationship is obtained in step 201, the configured grant configuration set is determined based on the mapping relationship and the target index indicated by the DCI; if at least two mapping relationships are obtained in step 201, the terminal needs to determine, based on a related parameter of the currently received DCI, a mapping relationship corresponding to the currently received DCI, and further determine the configured grant configuration set based on the determined mapping relationship and the target index indicated by the DCI.

Step 203: Activate or deactivate a configured grant configuration included in the configured grant configuration set that is determined.

In this step, the configured grant configuration included in the corresponding configured grant configuration set is activated or deactivated based on the target index indicated by the DCI, thereby reducing overheads for downlink activation or deactivation signalling (namely, downlink control signalling).

Optionally, in a case that at least two mapping relationships are obtained in step 201, step 202 includes:
  determining, based on a target parameter of the DCI, a mapping relationship corresponding to the target parameter; and
  determining, based on the determined mapping relationship, the configured grant configuration set corresponding to the target index that is indicated by the DCI.

Optionally, the target parameter of the DCI includes at least one of the following:
  a format of the DCI;
  a radio network temporary identifier (RNTI) corresponding to the DCI;
  a control resource set CORESET corresponding to the DCI; and
  a search space corresponding to the DCI.

Optionally, different target parameters correspond to different mapping relationships.

For example, DCI of format 1 corresponds to a mapping relationship 1, and DCI of format 2 corresponds to a mapping relationship 2. For another example, DCI scrambled by a specific RNTI corresponds to a mapping relationship 1, and DCI scrambled by an RNTI other than the specific RNTI corresponds to a mapping relationship 2.

Optionally, in another embodiment, the quantity of configured grant configurations included in a configured grant configuration set is different in mapping relationships corresponding to different target parameters. For example, the DCI of format 1 corresponds to the mapping relationship 1, and the mapping relationship 1 is a mapping relationship between a plurality of configured grant configuration sets 1 and a plurality of indexes. The plurality of configured grant configuration sets 1 each include one configured grant configuration. The DCI of format 2 corresponds to the mapping relationship 2, and the mapping relationship 2 is a mapping relationship between a plurality of configured grant configuration sets 2 and a plurality of indexes. The plurality of configured grant configuration sets 2 each include at least two configured grant configurations. In other words, in this case, a target index indicated by the DCI of format 1 is used to activate or deactivate one configured grant configuration; and a target index indicated by the DCI of format 2 is used to activate or deactivate at least two configured grant configurations.

Optionally, in the foregoing embodiment of this disclosure, step 201 includes:

obtaining a predefined mapping relationship between the plurality of configured grant configuration sets and the plurality of indexes; or
obtaining a network-configured mapping relationship between the plurality of configured grant configuration sets and the plurality of indexes.

For example, RRC signalling transmitted by the network-side device is received, and the RRC signalling is used to configure the mapping relationship between the plurality of configured grant configuration sets and the plurality of indexes.

It should be noted that when at least two mapping relationships are configured by the network, the at least two mapping relationships may be configured by using the same RRC signalling, or may be configured separately by using different RRC signalling, which is not specifically limited herein.

Optionally, in the foregoing embodiment of this disclosure, different configured grant configurations correspond to different demodulation reference signal (DMRS) parameters.

The DMRS parameter includes at least one of the following:
  a DMRS port;
  an orthogonal mask (OCC) used for a DMRS port; and
  a DMRS scrambling identifier.

Optionally, a quantity of bits N to be occupied by the target index is configured by the network side. For example, the network configures a value of N by using RRC signalling.

Alternatively, the quantity of bits N to be occupied by the target index is determined based on a quantity of configured grant configuration sets that are configured by the network side. For example, if the quantity of configured grant configuration sets is 4, the value of N configured by the network by using RRC signalling is 2 (that is, 00, 01, 10, and 11 are used to indicate different target indexes). For another example, if the quantity of configured grant configuration sets is 9, the value of N configured by the network by using RRC signalling is 4.

In an embodiment, in a case that the configured grant configuration set includes at least two configured grant configurations, the method further includes:
  determining a transmission occasion start position of each configured grant configuration in the configured grant configuration set based on first indication information indicated by the DCI and first radio resource control (RRC) configuration information.

The first indication information is used to indicate a transmission occasion start position of a first configured grant configuration, and the first configured grant configuration is any one configuration in the configured grant configuration set.

The first RRC configuration information is used to configure an offset value for transmission occasion start positions of the configured grant configurations in the configured grant configuration set. The offset value is an offset value relative to a transmission occasion start position of any one configured grant configuration in the configured grant configuration set, or an offset value relative to a reference position indicated by the network.

For example, what is configured by using RRC (configured by using first RRC configuration information) is an offset between transmission occasion start positions of two adjacent configured grant configurations in the configured grant configuration set, for example, an offset value between a transmission occasion start position of a second configured grant configuration and the transmission occasion start position of the first configured grant configuration. In the same configured grant configuration set, an index of the second configured grant configuration is adjacent to an index of the first configured grant configuration. Another example is an offset value between a transmission occasion start position of a third configured grant configuration and the transmission occasion start position of the second configured grant configuration. In the same configured grant configuration set, an index of the third configured grant configuration is adjacent to the index of the second configured grant configuration. Examples are not described one by one herein. The "first", "second", and "third" in "first configured grant configuration", "second configured grant configuration", and "third configured grant configuration" are merely intended to identify adjacent indexes, but not to limit specific positions thereof.

For another example, what is configured by using RRC (configured by using the first RRC configuration information) is an offset between each configured grant configuration in the configured grant configuration set and a reference position. For example, the reference position is a transmission occasion start position indicated by the DCI, or the reference position is a receiving occasion of the DCI.

In short, in a case that a target index indicated by one piece of DCI is used to activate or deactivate at least two configured grant configurations, the transmission occasion start position of the first configured grant configuration is first determined based on the first indication information indicated by the DCI; and then transmission occasion start positions of other configured grant configurations in the configured grant configuration set are determined based on the offset value between the transmission occasion start positions of the configured grant configurations that is configured in the first RRC configuration information.

In another embodiment, in a case that the configured grant configuration set includes at least two configured grant configurations, the method further includes:

determining a transmission occasion start position of each configured grant configuration in the configured grant configuration set based on second RRC configuration information, first indication information indicated by the DCI, and second indication information indicated by the DCI.

The second RRC configuration information is used to configure an offset value set for transmission occasion start positions of the configured grant configurations in the configured grant configuration set. The offset value set includes at least two offset values; and the offset value is an offset value relative to a transmission occasion start position of any one configured grant configuration in the configured grant configuration set, or an offset value relative to a reference position indicated by the network.

The first indication information is used to indicate a transmission occasion start position of a first configured grant configuration, and the first configured grant configuration is any one configuration in the configured grant configuration set.

The second indication information is used to indicate one offset value (namely, an actual offset value) in the offset value set.

In short, in a case that a target index indicated by one piece of DCI is used to activate or deactivate at least two configured grant configurations, the transmission occasion start position of the first configured grant configuration is first determined based on the first indication information indicated by the DCI; and then transmission occasion start positions of other configured grant configurations in the configured grant configuration set are determined based on the second indication information indicated by the DCI and the second RRC configuration information.

To sum up, in the foregoing embodiment of this disclosure, based on the network-configured mapping relationship between the configured grant configuration sets and the indexes, the DCI is flexibly used to activate or deactivate a corresponding configured grant configuration set, so as to reduce overheads for downlink activation or deactivation signalling and decrease power consumption of the terminal.

Figure 3:
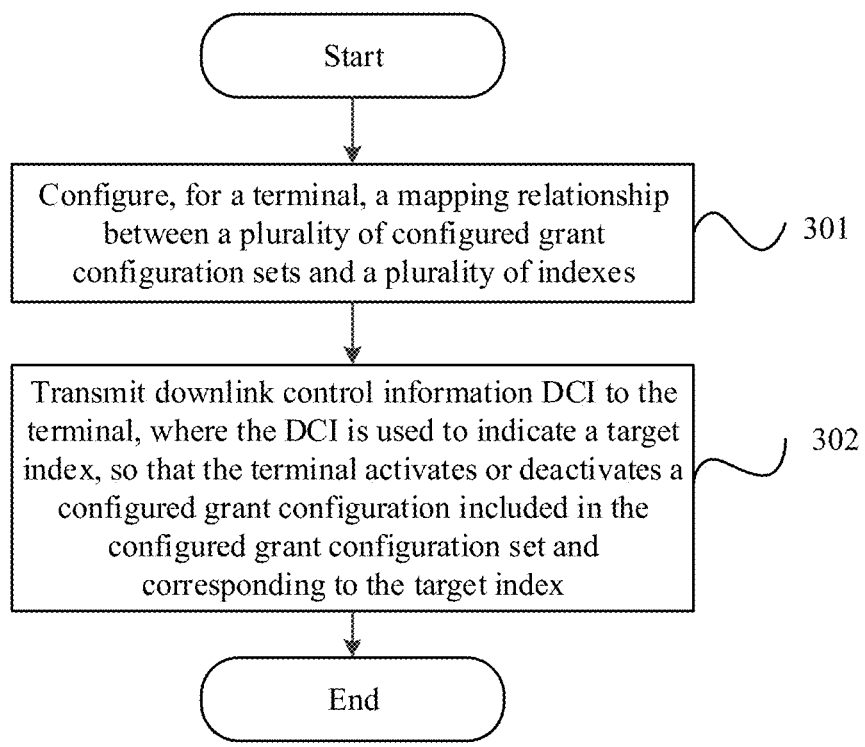
FIG. 3 is a flowchart 2 of steps of a method for configured grant configuration according to an embodiment of this disclosure.

As shown in FIG. 3, an embodiment of this disclosure further provides a method for configured grant configuration, applied to a network-side device and including:

Step 301: Configure, for a terminal, a mapping relationship between a plurality of configured grant configuration sets and a plurality of indexes, where the configured grant configuration set includes at least one configured grant configuration.

For example, in one mapping relationship, a configured grant configuration set 1 corresponds to an index 1, a configured grant configuration set 2 corresponds to an index 2, a configured grant configuration set 3 corresponds to an index 3, and a configured grant configuration set 4 corresponds to an index 4. For another example, in another mapping relationship, a configured grant configuration set 5 corresponds to an index 1, a configured grant configuration set 6 corresponds to an index 2, a configured grant configuration set 7 corresponds to an index 3, and a configured grant configuration set 8 corresponds to an index 4.

The foregoing index is used in the DCI to indicate a configured grant configuration set having a mapping relationship with the index.

It should be noted that the plurality of configured grant configuration sets included in different mapping relationships described above may be identical or different; similarly, the plurality of indexes included in the different mapping relationships described above may be identical or different. Examples are not described one by one herein.

Step 302: Transmit downlink control information (DCI) to the terminal, where the DCI is used to indicate a target index, so that the terminal activates or deactivates a configured grant configuration included in the configured grant configuration set and corresponding to the target index, where the target index is any one of the plurality of indexes.

In this embodiment of this disclosure, the network-side device uses the target index indicated by the DCI to instruct the terminal to activate or deactivate the configured grant configuration included in the corresponding configured grant configuration set, thereby reducing overheads for downlink activation or deactivation signalling (namely, downlink control signalling).

Optionally, in this embodiment of this disclosure, in a case that at least two mapping relationships are configured for the terminal by the network-side device, different mapping relationships correspond to different target parameters of the DCI.

The target parameter of the DCI includes at least one of the following:

a format of the DCI;
a radio network temporary identifier (RNTI) corresponding to the DCI;
a control resource set corresponding to the DCI; and
a search space corresponding to the DCI.

For example, DCI of format 1 corresponds to a mapping relationship 1, and DCI of format 2 corresponds to a mapping relationship 2. For another example, DCI scrambled by a specific RNTI corresponds to a mapping relationship 1, and DCI scrambled by an RNTI other than the specific RNTI corresponds to a mapping relationship 2.

Optionally, in another embodiment, a quantity of configured grant configurations included in a configured grant configuration set is different in mapping relationships corresponding to different target parameters. For example, the DCI of format 1 corresponds to the mapping relationship 1, and the mapping relationship 1 is a mapping relationship between a plurality of configured grant configuration sets 1 and a plurality of indexes. The plurality of configured grant configuration sets 1 each include one configured grant configuration. The DCI of format 2 corresponds to the mapping relationship 2, and the mapping relationship 2 is a mapping relationship between a plurality of configured grant configuration sets 2 and a plurality of indexes. The plurality of configured grant configuration sets 2 each include at least two configured grant configurations. In other words, in this case, a target index indicated by the DCI of format 1 is used to activate or deactivate one configured grant configuration; and a target index indicated by the DCI of format 2 is used to activate or deactivate at least two configured grant configurations.

Optionally, in the foregoing embodiment of this disclosure, the method further includes:
configuring different demodulation reference signal (DMRS) parameters corresponding to different configured grant configurations.

The DMRS parameter includes at least one of the following:
a DMRS port;
an orthogonal mask (OCC) used for a DMRS port; and
a DMRS scrambling identifier.

Further, the method further includes:
configuring a quantity of bits N to be occupied by the target index; for example, the network configures the value of N by using RRC signalling;
or
configuring, based on a quantity of configured grant configuration sets that are configured, the quantity of bits N to be occupied by the target index, where, for example, if the quantity of configured grant configuration sets is 4, the value of N configured by the network by using RRC signalling is 2 (that is, 00, 01, 10, and 11 are used to indicate different target indexes); for another example, if the quantity of configured grant configuration sets is 9, the value of N configured by the network by using RRC signalling is 4.

Further, in the foregoing embodiment of this disclosure, the method further includes:
configuring an identifier of each configured grant configuration, where identifiers of different types of configured grant configurations are jointly numbered or independently numbered.

For example, an identifier corresponding to each configured grant configuration (such as an ID of each configured grant configuration) is configured.

Joint numbering specifically means that: IDs of type 1 configured grant configurations and IDs of type 2 configured grant configurations belong to a common ID numbering set. For example, there are a total of 16 IDs, and any one ID may be configured for type 1 or type 2.

Separate numbering specifically means that: IDs of type 1 configured grant configurations and IDs of type 2 configured grant configurations belong to different ID numbering sets. For example, there are a total of 16 IDs. An ID set available for type 1 is 0 to 7, and an ID set available for type 2 is 8 to 15.

It should be noted that the network-side device presets a maximum configuration quantity of configured grant configurations, where the maximum configuration quantity includes a total quantity of type 1 and type 2 configured grant configurations, or the maximum configuration quantity includes a total quantity of type 2 configured grant configurations.

In an embodiment, in a case that the configured grant configuration set includes at least two configured grant configurations, the method further includes:
transmitting first radio resource control (RRC) configuration information to the terminal, where the first RRC configuration information is used to configure an offset value for transmission occasion start positions of the configured grant configurations in the configured grant configuration set; and the offset value is an offset value relative to a transmission occasion start position of any one configured grant configuration in the configured grant configuration set, or an offset value relative to a reference position indicated by the network.

The DCI further indicates first indication information, the first indication information is used to indicate a transmission occasion start position of a first configured grant configuration, and the first configured grant configuration is any one configuration in the configured grant configuration set.

For example, what is configured by using RRC (configured by using first RRC configuration information) is an offset between transmission occasion start positions of two adjacent configured grant configurations, for example, an offset value between a transmission occasion start position of a second configured grant configuration and the transmission occasion start position of the first configured grant configuration. In the same configured grant configuration set, an index of the second configured grant configuration is adjacent to an index of the first configured grant configuration. Another example is an offset value between a transmission occasion start position of a third configured grant configuration and the transmission occasion start position of the second configured grant configuration. In the same configured grant configuration set, an index of the third configured grant configuration is adjacent to the index of the second configured grant configuration. Examples are not described one by one herein. First, second, and third in the first configured grant configuration, the second configured grant configuration, and the third configured grant configuration are merely intended to identify adjacent indexes, but not to limit specific positions thereof.

For another example, what is configured by using RRC (configured by using the first RRC configuration information) is an offset between each configured grant configuration and a reference position. For example, the reference position is the transmission occasion start position (namely, a transmission occasion start position indicated by the DCI) of the first configured grant configuration in a configured grant configuration set, or the reference position is a receiving occasion of the DCI.

In short, in a case that a target index indicated by one piece of DCI is used to activate or deactivate at least two configured grant configurations, the network-side device indicates the transmission occasion start position of the first configured grant configuration by using the first indication information indicated by the DCI, and then configures an offset value between transmission occasion start positions of two adjacent configured grant configurations by using the first RRC configuration information.

In another embodiment, in a case that the configured grant configuration set includes at least two configured grant configurations, the method further includes:

transmitting second RRC configuration information to the terminal, where the second RRC configuration information is used to configure an offset value set for transmission occasion start positions of the configured grant configurations in the configured grant configuration set; the offset value set includes at least two offset values; and the offset value is an offset value relative to a transmission occasion start position of any one configured grant configuration in the configured grant configuration set, or an offset value relative to a reference position indicated by the network.

The DCI further indicates first indication information and second indication information, the first indication information is used to indicate a transmission occasion start position of a first configured grant configuration, and the first configured grant configuration is any one configuration in the configured grant configuration set, and the second indication information is used to indicate one offset value (namely, an actual offset value) in the offset value set.

In short, in a case that a target index indicated by one piece of DCI is used to activate or deactivate at least two configured grant configurations, the transmission occasion start position of the first configured grant configuration is first indicated based on the first indication information indicated by the DCI; and then transmission occasion start positions of other configured grant configurations in the configured grant configuration set are determined based on the second indication information indicated by the DCI and the second RRC configuration information.

To sum up, in the foregoing embodiment of this disclosure, based on the network-configured mapping relationship between the configured grant configuration sets and the indexes, the DCI is flexibly used to activate or deactivate a corresponding configured grant configuration set, so as to reduce overheads for downlink activation or deactivation signalling and decrease power consumption of the terminal.

In order to more clearly describe the method for configured grant configuration provided in this embodiment of this disclosure, the following provides description in detail in combination with several examples:

Example 1

The network configures a plurality of configured grants for the terminal by using RRC signalling, and IDs of the plurality of configured grants are $\{0,1,2,3\}$. The terminal receives the DCI used for activation, activates a configured grant configuration set corresponding to the target index that is indicated by the DCI, and then determines, based on a parameter (such as time-frequency resource allocation or MCS) indicated by the activation DCI, a transmission parameter of the configured grant configuration included in the configured grant configuration that is activated.

The network configures a mapping relationship between a plurality of configured grant configuration sets and a plurality of indexes. For example, the mapping relationship is shown in Table 1.

TABLE 1

| Index | Corresponding configured grant configuration set that is activated or deactivated |
|---|---|
| 0 | Configured grant configuration set, ID = $\{0\}$ |
| 1 | Configured grant configuration set, ID = $\{1\}$ |
| 2 | Configured grant configuration set, ID = $\{2\}$ |
| 3 | Configured grant configuration set, ID = $\{3\}$ |
| 4 | Configured grant configuration set, ID = $\{0, 1, 2, 3\}$ |
| ... | ... |

For example, when the target index indicated by the DCI is 2, a configured grant configuration with an ID of 2 is activated. For another example, when the target index indicated by the DCI is 4, a plurality of configured grant configurations with IDs of $\{0,1,2,3\}$ are activated.

Example 2

The network configures a plurality of configured grants for the terminal by using RRC signalling, and IDs of the plurality of configured grants are $\{0,1,2,3\}$. When the UE receives activation DCI scrambled by an RNTI 1, according to the mapping relationship in Table 2, the target index in the DCI indicates one configured grant (that is, a configured grant set includes one configured grant) for activation. When the UE receives activation DCI scrambled by an RNTI 2, according to the mapping relationship in Table 3, the target index in the DCI indicates a plurality of configured grants (that is, a configured grant set includes a plurality of configured grants) for activation. The terminal receives the DCI used for activation, activates a configured grant configuration set corresponding to the target index that is indicated by the DCI, and then determines, based on a parameter (such as time-frequency resource allocation or MCS) indicated by the activation DCI, a transmission parameter of the configured grant configuration included in the configured grant configuration that is activated.

The network configures two mapping relationships between a plurality of configured grant configuration sets and a plurality of indexes. For example, the two mapping relationships are shown in Table 2 and Table 3.

TABLE 2

DCI scrambled by RNTI 1

| Index | Corresponding configured grant configuration set that is activated or deactivated |
|---|---|
| 0 | Configured grant configuration set, ID = $\{0\}$ |
| 1 | Configured grant configuration set, ID = $\{1\}$ |
| 2 | Configured grant configuration set, ID = $\{2\}$ |
| 3 | Configured grant configuration set, ID = $\{3\}$ |

TABLE 3

DCI scrambled by RNTI 2

| Index | Corresponding configured grant configuration set that is activated or deactivated |
|---|---|
| 0 | Configured grant configuration set, ID = $\{0, 2\}$ |
| 1 | Configured grant configuration set, ID = $\{1, 3\}$ |
| 2 | Configured grant configuration set, ID = $\{0, 1, 2\}$ |
| 3 | Configured grant configuration set, ID = $\{1, 2, 3\}$ |
| 4 | Configured grant configuration set, ID = $\{0, 1, 2, 3\}$ |

For example, when the target index indicated by the DCI scrambled by the RNTI 1 is 2, a configured grant configuration with an ID of 2 is activated. For another example, when the target index indicated by the DCI scrambled by the RNTI 2 is 2, a plurality of configured grant configurations with IDs of {0,1,2} are activated.

Example 3

The network configures a plurality of configured grants for the terminal by using RRC signalling, and IDs of the plurality of configured grants are {0,1,2,3}. In addition, different DMRS parameters or sequences are allocated for different configured grant configurations.

The network configures a mapping relationship between a plurality of configured grant configuration sets and a plurality of indexes by using RRC signaling, and the network also configures an offset value between transmission occasion start positions of two adjacent configured grant configurations by using RRC signaling, as shown in Table 4.

TABLE 4

| Index | Corresponding configured grant configuration set that is activated or deactivated | Start position offset value (offset relative to a start position of a previous ID) |
|---|---|---|
| 0 | Configured grant configuration set, ID = {0} | — |
| 1 | Configured grant configuration set, ID = {1} | — |
| 2 | Configured grant configuration set, ID = {2} | — |
| 3 | Configured grant configuration set, ID = {3} | — |
| 4 | Configured grant configuration set, ID = {0, 2} | X time units |
| 5 | Configured grant configuration set, ID = {1, 3} | Y time units |
| 6 | Configured grant configuration set, ID = {0, 1, 2, 3} | Z time units |
| 7 | . . . | . . . |

The DCI indicates the target index and a transmission occasion start position that is of one configured grant configuration in the configured grant configuration set. The time unit may be slot, symbol, transmission occasion, or the like, which is not specifically limited herein.

Figure 4:
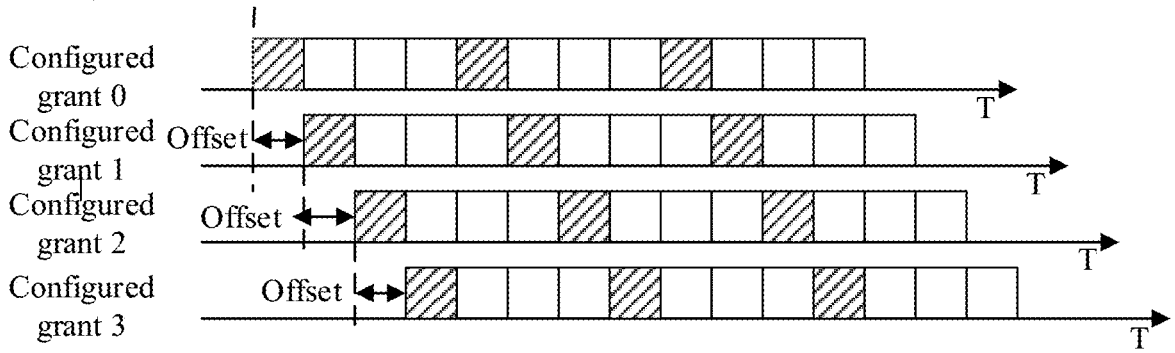
FIG. 4 is a schematic diagram 1 of a plurality of configured grant configurations in a method for configured grant configuration according to an embodiment of this disclosure.

For example, when the target index in the received DCI used for activation is 6, a plurality of configurations with the IDs of {0,1,2,3} are correspondingly activated. In addition, what is configured by using RRC signaling is that an offset between starts positions of two adjacent configured grant configurations is Z=1 transmission occasions. FIG. 4 is a schematic diagram of configured grant configurations in the configured grant configuration set {0,1,2,3}.

Figure 5:
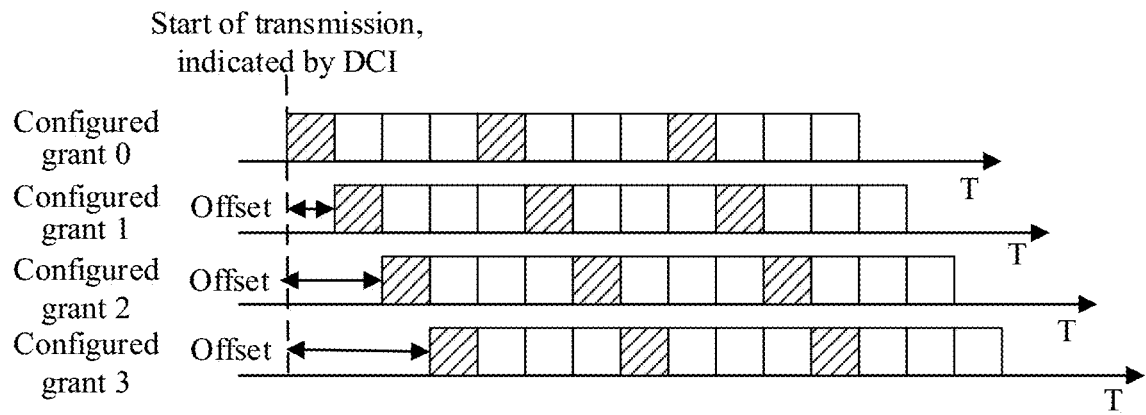
FIG. 5 is a schematic diagram 2 of a plurality of configured grant configurations in a method for configured grant configuration according to an embodiment of this disclosure.

When the target index in the received DCI used for activation is 4, a plurality of configurations with the IDs of {0,2} are correspondingly activated. In addition, what is configured by using RRC signaling is that an offset between starts positions of two adjacent configured grant configurations is X=2 transmission occasions. FIG. 5 is a schematic diagram of configured grant configurations in the configured grant configuration set {0,2}.

Example 4

The network configures a plurality of configured grants for the terminal by using RRC signalling, and IDs of the plurality of configured grants are {0,1,2,3}. In addition, different DMRS parameters or sequences are allocated for different configured grant configurations.

The network configures a mapping relationship between a plurality of configured grant configuration sets and a plurality of indexes by using RRC signaling, and the network also configures, by using RRC signaling, an offset value between a reference position and a transmission occasion start position of each configured grant configuration in the configured grant configuration set. The reference position is a start transmission position indicated by the activation DCI during activation of the configured grant configuration set, as shown in Table 5.

TABLE 5

| Index | Corresponding configured grant configuration set that is activated or deactivated | Start position offset value (offset relative to a reference position) |
|---|---|---|
| 0 | Configured grant configuration set, ID = {0} | — |
| 1 | Configured grant configuration set, ID = {1} | — |
| 2 | Configured grant configuration set, ID = {2} | — |
| 3 | Configured grant configuration set, ID = {3} | — |
| 4 | Configured grant configuration set, ID = {0, 2} | ID = 0: 0 time unit<br>ID = 2: X time units |
| 5 | Configured grant configuration set, ID = {1, 3} | ID = 1: 0 time unit<br>ID = 3: Y time units |
| 6 | Configured grant configuration set, ID = {0, 1, 2, 3} | ID = 0: 0 time unit<br>ID = 1: Z1 time units<br>ID = 2: Z2 time units<br>ID = 3: Z3 time units |
| 7 | . . . | . . . |

The DCI indicates the target index and a transmission occasion start position that is of one configured grant configuration in the configured grant configuration set. The time unit may be slot, symbol, transmission occasion, or the like, which is not specifically limited herein.

For example, when the target index in the received DCI used for activation is 6, a plurality of configurations with the IDs of {0,1,2,3} are correspondingly activated. In addition, what is configured by using RRC signaling is that the offset between the reference position and the transmission occasion start position of each configured grant configuration in the configured grant configuration set is 0, Z1=1, Z2=2, and Z3=3 transmission occasions. FIG. 5 is a schematic diagram of configured grant configurations in the configured grant configuration set {0,1,2,3}.

Figure 6:
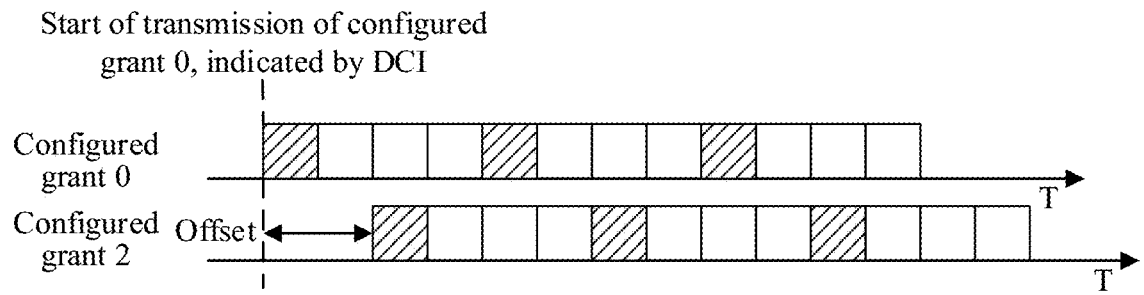
FIG. 6 is a schematic diagram 3 of a plurality of configured grant configurations in a method for configured grant configuration according to an embodiment of this disclosure.

When the target index in the received DCI used for activation is 4, a plurality of configurations with the IDs of {0,2} are correspondingly activated. In addition, what is configured by using RRC signaling is that the offset between the reference position and the transmission occasion start position of each configured grant configuration in the configured grant configuration set is 0 and X=2 transmission occasions. FIG. 6 is a schematic diagram of configured grant configurations in the configured grant configuration set {0,2}.

Example 5

The network configures a plurality of configured grants for the terminal by using RRC signalling, and IDs of the plurality of configured grants are {0,1,2,3}. In addition, different DMRS parameters or sequences are allocated for different configured grant configurations.

The network configures a mapping relationship between a plurality of configured grant configuration sets and a plurality of indexes by using RRC signaling, and as shown in Table 6, the network also configures an offset value set between transmission occasion start positions of two adjacent configured grant configurations by using RRC signaling. For example, the offset value set is { 1,2} transmission occasions.

TABLE 6

| Index | Corresponding configured grant configuration set that is activated or deactivated |
|---|---|
| 0 | Type2 configured grant configuration set, ID = {0} |
| 1 | Type2 configured grant configuration set, ID{1} |
| 2 | Type2 configured grant configuration set, ID{2} |
| 3 | Type2 configured grant configuration set, ID{3} |
| 4 | Type2 configured grant configuration set, ID{0, 2} |
| 5 | Type2 configured grant configuration set, ID{1, 3} |
| 6 | Type2 configured grant configuration set, ID{0, 1, 2, 3} |
| 7 | Idle |

The DCI indicates the target index and a transmission occasion start position that is of one configured grant configuration in the configured grant configuration set.

When the target index in the received DCI used for activation is 6, a plurality of configurations with the IDs of {0,1,2,3} are correspondingly activated. In addition, the DCI indicates that an offset between starts positions of two adjacent configured grant configurations is one transmission occasion. FIG. 4 is a schematic diagram of configured grant configurations in the configured grant configuration set {0,1,2,3}.

When the target index in the received DCI used for activation is 4, a plurality of configurations with the IDs of {0,2} are correspondingly activated. In addition, the DCI indicates that an offset between starts positions of two adjacent configured grant configurations is two transmission occasions. FIG. 6 is a schematic diagram of configured grant configurations in the configured grant configuration set {0,2}.

To sum up, in the foregoing embodiment of this disclosure, the network-side device can flexibly use the DCI to activate or deactivate a plurality of configured grant configurations in a network configuration manner based on a service requirement and/or an application scenario, thereby reducing overheads for downlink control signalling.

Figure 7:
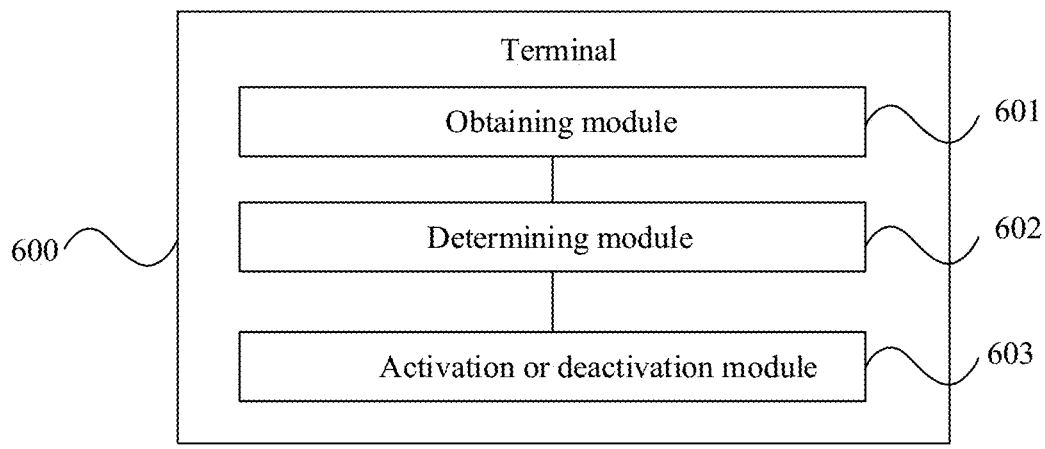
FIG. 7 is a schematic structural diagram 1 of a terminal according to an embodiment of this disclosure.

As shown in FIG. 7, an embodiment of this disclosure further provides a terminal 600, including:
    an obtaining module 601, configured to obtain a mapping relationship between a plurality of configured grant configuration sets and a plurality of indexes, where the configured grant configuration set includes at least one configured grant configuration;
    a determining module 602, configured to receive downlink control information (DCI) and determine, based on the mapping relationship, a configured grant configuration set corresponding to a target index that is indicated by the DCI, where the target index is any one of the plurality of indexes; and
    an activation or deactivation module 603, configured to activate or deactivate a configured grant configuration included in the configured grant configuration set that is determined.

Optionally, in the foregoing embodiment of this disclosure, the determining module 602 includes:

a first determining submodule, configured to determine, based on a target parameter of the DCI, a mapping relationship corresponding to the target parameter; and
    a second determining submodule, configured to determine, based on the determined mapping relationship, the configured grant configuration set corresponding to the target index that is indicated by the DCI.

Optionally, in the foregoing embodiment of this disclosure, the target parameter of the DCI includes at least one of the following:
    a format of the DCI;
    a radio network temporary identifier (RNTI) corresponding to the DCI;
    a control resource set corresponding to the DCI; and
    a search space corresponding to the DCI.

Optionally, in the foregoing embodiment of this disclosure, the obtaining module 601 includes:
    an obtaining submodule, configured to obtain a predefined mapping relationship between the plurality of configured grant configuration sets and the plurality of indexes; or configured to obtain a network-configured mapping relationship between the plurality of configured grant configuration sets and the plurality of indexes.

Optionally, in the foregoing embodiment of this disclosure, the terminal further includes:
    a first occasion determining module, configured to determine a transmission occasion start position of each configured grant configuration in the configured grant configuration set based on first indication information indicated by the DCI and first radio resource control (RRC) configuration information.

The first indication information is used to indicate a transmission occasion start position of a first configured grant configuration, and the first configured grant configuration is any one configuration in the configured grant configuration set.

The first RRC configuration information is used to configure an offset value between transmission occasion start positions of two adjacent configured grant configurations in the configured grant configuration set.

Optionally, in the foregoing embodiment of this disclosure, the terminal further includes:
    a second occasion determining module, configured to determine a transmission occasion start position of each configured grant configuration in the configured grant configuration set based on second RRC configuration information, first indication information indicated by the DCI, and second indication information indicated by the DCI.

The second RRC configuration information is used to configure an offset value set between transmission occasion start positions of two adjacent configured grant configurations in the configured grant configuration set, and the offset value set includes at least two offset values.

The first indication information is used to indicate a transmission occasion start position of a first configured grant configuration, and the first configured grant configuration is any one configuration in the configured grant configuration set.

The second indication information is used to indicate one offset value in the offset value set.

Optionally, in the foregoing embodiment of this disclosure, different configured grant configurations correspond to different demodulation reference signal (DMRS) parameters.

The DMRS parameter includes at least one of the following:
- a DMRS port;
- an orthogonal mask (OCC) used for a DMRS port; and
- a DMRS scrambling identifier.

Optionally, in the foregoing embodiment of this disclosure, a quantity of bits to be occupied by the target index is configured by a network side, or determined based on a quantity of configured grant configuration sets that are configured by the network side.

To sum up, in the foregoing embodiment of this disclosure, based on the network-configured mapping relationship between the configured grant configuration sets and the indexes, the DCI is flexibly used to activate or deactivate a corresponding configured grant configuration set, so as to reduce overheads for downlink activation or deactivation signalling and decrease power consumption of the terminal.

It should be noted that the terminal provided in the embodiments of this disclosure is a terminal capable of executing the foregoing method for configured grant configuration applied to the terminal side, and all embodiments of the method for configured grant configuration are applicable to the terminal, with the same or similar beneficial effects achieved.

Figure 8:
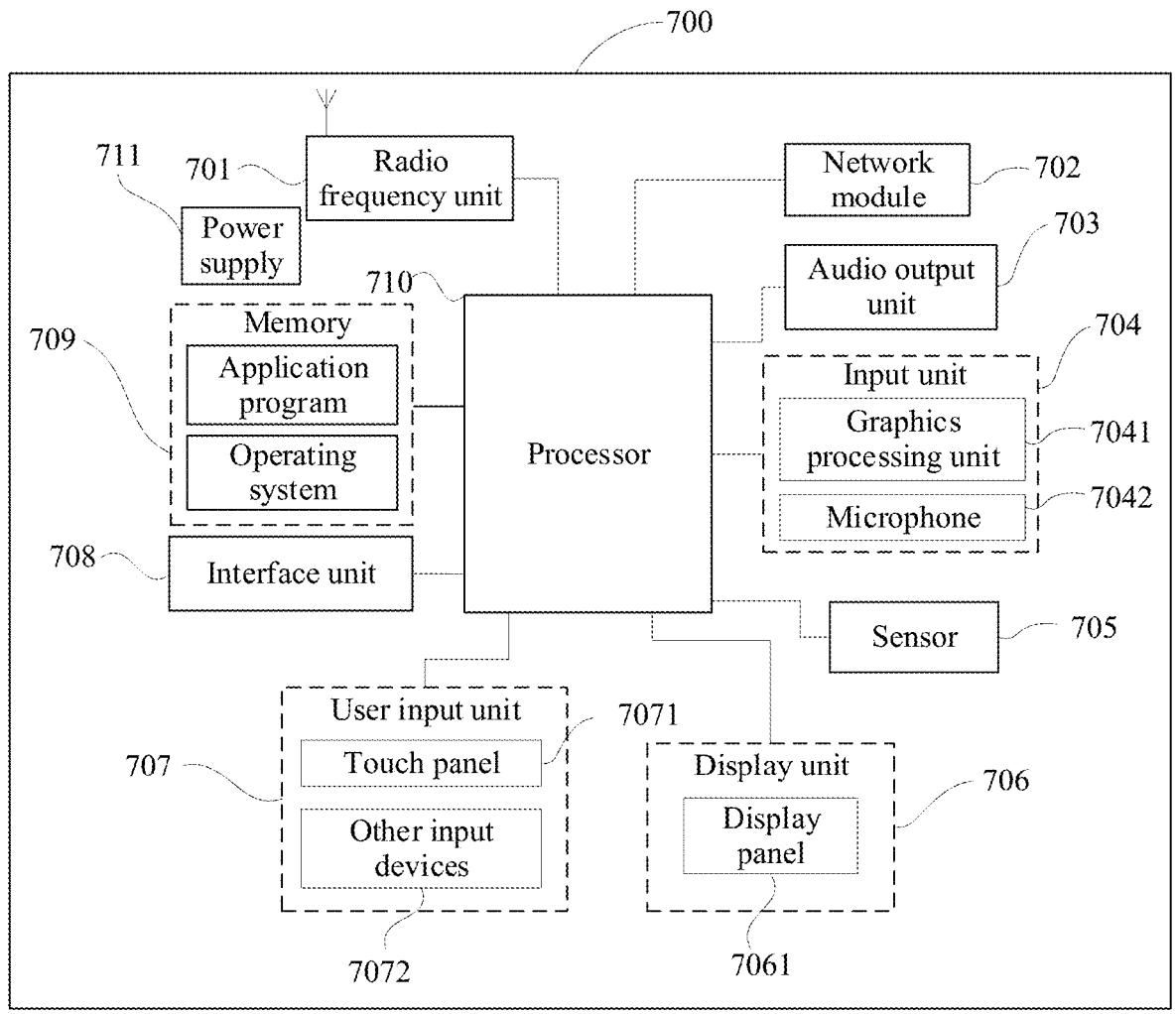
FIG. 8 is a schematic structural diagram 2 of a terminal according to an embodiment of this disclosure.

FIG. 8 is a schematic structural diagram of hardware of a terminal for implementing the embodiments of this disclosure. The terminal 700 includes but is not limited to components such as a radio frequency unit 701, a network module 702, an audio output unit 703, an input unit 704, a sensor 705, a display unit 706, a user input unit 707, an interface unit 708, a memory 709, a processor 710, and a power supply 711. A person skilled in the art may understand that the structure of the terminal shown in FIG. 8 does not constitute any limitation on the terminal device. The terminal may include more or fewer components than those shown in the figure, or a combination of some components, or the components disposed differently. In this embodiment of this disclosure, the terminal includes but is not limited to a mobile phone, a tablet computer, a laptop computer, a personal digital assistant, an in-vehicle terminal, a wearable device, a pedometer, and the like.

The radio frequency unit 701 is configured to obtain a mapping relationship between a plurality of configured grant configuration sets and a plurality of indexes, where the configured grant configuration set includes at least one configured grant configuration. The radio frequency unit 701 is further configured to receive downlink control information (DCI).

The processor 710 is configured to determine, based on the mapping relationship, a configured grant configuration set corresponding to a target index that is indicated by the DCI, where the target index is any one of the plurality of indexes. The processor 710 is further configured to activate or deactivate a configured grant configuration included in the configured grant configuration set that is determined.

To sum up, in the foregoing embodiment of this disclosure, based on the network-configured mapping relationship between the configured grant configuration sets and the indexes, the DCI is flexibly used to activate or deactivate a corresponding configured grant configuration set, so as to reduce overheads for downlink activation or deactivation signalling and decrease power consumption of the terminal.

It should be noted that the terminal provided in the embodiments of this disclosure is a terminal capable of executing the foregoing method for configured grant configuration applied to the terminal side, and all embodiments of the method for configured grant configuration are applicable to the terminal, with the same or similar beneficial effects achieved.

It should be understood that in this embodiment of this disclosure, the radio frequency unit 701 may be configured to: receive and transmit signals in an information receiving/transmitting process or a call process; and specifically, after receiving downlink data from a base station, transmit the downlink information to the processor 710 for processing, and in addition, transmit uplink data to the base station. Generally, the radio frequency unit 701 includes but is not limited to an antenna, at least one amplifier, a transceiver, a coupler, a low noise amplifier, a duplexer, and the like. In addition, the radio frequency unit 701 may also communicate with a network and other devices via a wireless communications system.

The terminal provides a user with wireless broadband internet access through the network module 702, for example, helping the user to transmit and receive e-mails, browse web pages, and access streaming media.

The audio output unit 703 may convert audio data received by the radio frequency unit 701 or the network module 702 or stored in the memory 709 into an audio signal and output the audio signal as a sound. Furthermore, the audio output unit 703 may also provide audio output (for example, a call signal received sound or a message received sound) related to a specific function performed by the terminal 700. The audio output unit 703 includes a speaker, a buzzer, a receiver, and the like.

The input unit 704 is configured to receive an audio or video signal. The input unit 704 may include a graphics processing unit (GPU) 7041 and a microphone 7042. The graphics processing unit 7041 processes image data of a still picture or video obtained by an image capture apparatus (such as a camera) in a video capture mode or an image capture mode. A processed image frame may be displayed on the display unit 706. The image frame processed by the graphics processing unit 7041 may be stored in the memory 709 (or another storage medium) or be transmitted by the radio frequency unit 701 or the network module 702. The microphone 7042 is capable of receiving sounds and processing such sounds into audio data. The processed audio data may be converted in a telephone call mode into a format that can be transmitted by the radio frequency unit 701 to a mobile communications base station, for outputting.

The terminal 700 may further include at least one sensor 705, for example, an optical sensor, a motion sensor, and another sensor. Specifically, the optical sensor may include an ambient light sensor and a proximity sensor. The ambient light sensor may adjust luminance of the display panel 7061 based on brightness of ambient light, and the proximity sensor may turn off the display panel 7061 and/or backlight when the terminal 700 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the terminal, functions related to vibration recognition (such as pedometer and tapping), and the like. The sensor 705 may also include a fingerprint sensor, a pressure sensor, an iris sensor, a molecular sensor, a gyroscope, a barometer, a hygrometer, a thermometer, an infrared sensor, and the like. Details are not described herein.

The display unit 706 is configured to display information input by the user or information provided to the user. The display unit 706 may include a display panel 7061, and the display panel 7061 may be configured in a form of a liquid crystal display (LCD), an organic light-emitting diode (OLED), or the like.

The user input unit 707 may be configured to receive input digit or character information and generate key signal input related to user setting and function control of the mobile terminal. Specifically, the user input unit 707 may include a touch panel 7071 and other input devices 7072. The touch panel 7071 is also referred to as a touchscreen and can collect a touch operation (such as an operation performed by the user on the touch panel 7071 or near the touch panel 7071 with a finger or by using any proper object or accessory such as a stylus) of the user on or near the touch panel 7071. The touch panel 7071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and transmits the touchpoint coordinates to the processor 710, and can receive a command transmitted by the processor 710 and execute the command. In addition, the touch panel 7071 may be implemented in a plurality of forms, for example, as a resistive, capacitive, infrared, or surface acoustic wave touch panel. In addition to the touch panel 7071, the user input unit 707 may further include other input devices 7072. Specifically, the other input devices 7072 may include but are not limited to a physical keyboard, a function key (such as a volume control key or an on/off key), a trackball, a mouse, and a joystick. Details are not described herein.

Further, the touch panel 7071 may cover the display panel 7061. When detecting a touch operation on or near the touch panel 7071, the touch panel 7071 transmits the touch operation to the processor 710 to determine a type of a touch event. Then, the processor 710 provides a corresponding visual output on the display panel 7061 based on the type of the touch event. Although in FIG. 8, the touch panel 7071 and the display panel 7061 act as two separate parts to implement input and output functions of the terminal, in some embodiments, the touch panel 7071 and the display panel 7061 may be integrated to implement the input and output functions of the terminal. This is not specifically limited herein.

The interface unit 708 is an interface between an external apparatus and the terminal 700. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 708 may be configured to: receive input (for example, data information and power) from the external apparatus, and transmit the received input to one or more elements in the terminal 700, or may be configured to transmit data between the terminal 700 and the external apparatus.

The memory 709 may be configured to store software programs and various data. The memory 709 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 709 may include a high-speed random access memory, and may further include a non-volatile memory such as at least one disk storage device, a flash memory device, or another volatile solid-state storage device.

The processor 710 is a control center of the terminal, and is connected to all components of the terminal by using various interfaces and lines. By running or executing a software program and/or module that is stored in the memory 709 and calling data stored in the memory 709, the processor 710 executes various functions of the terminal and processes data, so as to perform overall monitoring on the terminal. The processor 710 may include one or more processing units. Optionally, an application processor and a modem processor may be integrated in the processor 710. The application processor primarily processes an operating system, user interfaces, application programs, and the like. The modem processor primarily processes radio communication. It can be understood that the modem processor may alternatively be not integrated in the processor 710.

The terminal 700 may further include the power supply 711 (for example, a battery) supplying power to all components. Optionally, the power supply 711 may be logically connected to the processor 710 through a power management system. In this way, functions such as charge management, discharge management, and power consumption management are implemented by using the power management system.

In addition, the terminal 700 includes some functional modules that are not shown. Details are not described herein.

Optionally, an embodiment of this disclosure further provides a terminal, including a processor, a memory, and a computer program stored in the memory and capable of running on the processor. When the computer program is executed by the processor, the processes of the embodiment of the foregoing method for configured grant configuration applied to the terminal side are implemented, with the same technical effects achieved. To avoid repetition, details are not described herein again.

An embodiment of this disclosure further provides a computer-readable storage medium. The computer-readable storage medium stores a computer program, and when the computer program is executed by a processor, the processes of the embodiment of the foregoing method for configured grant configuration applied to the terminal side are implemented, with the same technical effects achieved. To avoid repetition, details are not described herein again. The computer-readable storage medium is, for example, a read-only memory (ROM for short), a random access memory (RAM for short), a magnetic disk, or an optical disc.

Figure 9:
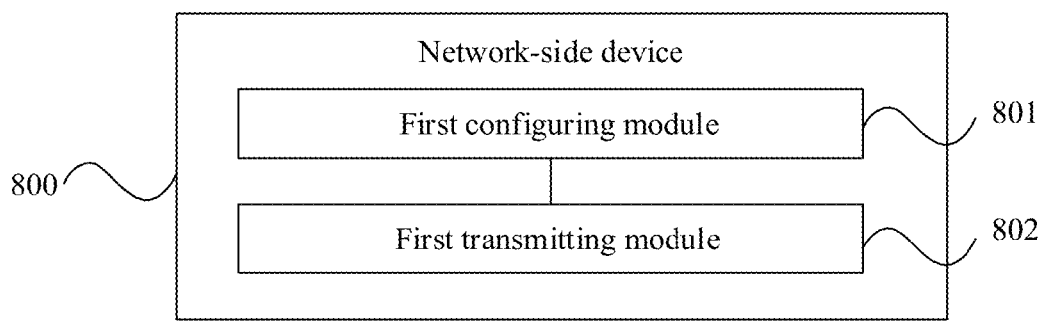
FIG. 9 is a schematic structural diagram of a network-side device according to an embodiment of this disclosure.

As shown in FIG. 9, an embodiment of this disclosure further provides a network-side device 800, including:

a first configuring module 801, configured to configure, for a terminal, a mapping relationship between a plurality of configured grant configuration sets and a plurality of indexes, where the configured grant configuration set includes at least one configured grant configuration; and a first transmitting module 802, configured to transmit downlink control information (DCI) to the terminal, where the DCI is used to indicate a target index, so that the terminal activates or deactivates a configured grant configuration included in the configured grant configuration set and corresponding to the target index, where the target index is any one of the plurality of indexes.

Optionally, in this embodiment of this disclosure, in a case that at least two mapping relationships are configured for the terminal, different mapping relationships correspond to different target parameters of the DCI.

The target parameter of the DCI includes at least one of the following:
- a format of the DCI;
- a radio network temporary identifier (RNTI) corresponding to the DCI;
- a control resource set corresponding to the DCI; and
- a search space corresponding to the DCI.

Optionally, in the foregoing embodiment of this disclosure, the network-side device further includes:
- a second transmitting module, configured to: in a case that the configured grant configuration set includes at least two configured grant configurations, transmit first radio resource control (RRC) configuration information to the terminal, where the first RRC configuration information is used to configure an offset value between transmission occasion start positions of two adjacent configured grant configurations in the configured grant configuration set.

The DCI further indicates first indication information, the first indication information is used to indicate a transmission occasion start position of a first configured grant configuration, and the first configured grant configuration is any one configuration in the configured grant configuration set.

Optionally, in the foregoing embodiment of this disclosure, the network-side device further includes:
- a third transmitting module, configured to: in a case that the configured grant configuration set includes at least two configured grant configurations, transmit second RRC configuration information to the terminal, where the second RRC configuration information is used to configure an offset value between transmission occasion start positions of two adjacent configured grant configurations in the configured grant configuration set, and the offset value set includes at least two offset values.

The DCI further indicates first indication information and second indication information, the first indication information is used to indicate a transmission occasion start position of a first configured grant configuration, and the first configured grant configuration is any one configuration in the configured grant configuration set, and the second indication information is used to indicate one offset value in the offset value set.

Optionally, in the foregoing embodiment of this disclosure, the network-side device further includes:
- a second configuring module, configured to configure different demodulation reference signal (DMRS) parameters corresponding to different configured grant configurations.

The DMRS parameter includes at least one of the following:
- a DMRS port;
- an orthogonal mask (OCC) used for a DMRS port; and
- a DMRS scrambling identifier.

Optionally, in the foregoing embodiment of this disclosure, the network-side device further includes:
- a third configuring module, configured to configure a quantity of bits to be occupied by the target index; or configured to configure, based on a quantity of configured grant configuration sets that are configured, a quantity of bits to be occupied by the target index.

Optionally, in the foregoing embodiment of this disclosure, the network-side device further includes:
- a fourth configuring module, configured to configure an identifier of each configured grant configuration, where identifiers of different types of configured grant configurations are jointly numbered or independently numbered.

To sum up, in the foregoing embodiment of this disclosure, based on the network-configured mapping relationship between the configured grant configuration sets and the indexes, the DCI is flexibly used to activate or deactivate a corresponding configured grant configuration set, so as to reduce overheads for downlink activation or deactivation signalling and decrease power consumption of the terminal.

It should be noted that the network-side device provided in this embodiment of this disclosure is a network-side device capable of executing the foregoing method for configured grant configuration applied to the network-side device side, and all embodiments of the method for configured grant configuration are applicable to the network-side device, with the same or similar beneficial effects achieved.

Optionally, an embodiment of this disclosure further provides a terminal, including a processor, a memory, and a computer program stored in the memory and capable of running on the processor. When the computer program is executed by the processor, the processes of the embodiment of the foregoing method for configured grant configuration applied to the network-side device side are implemented, with the same technical effects achieved. To avoid repetition, details are not described herein again.

An embodiment of this disclosure further provides a computer-readable storage medium. The computer-readable storage medium stores a computer program, and when the computer program is executed by a processor, the processes of the embodiment of the foregoing method for configured grant configuration applied to the network-side device side are implemented, with the same technical effects achieved. To avoid repetition, details are not described herein again. The computer-readable storage medium is, for example, a read-only memory (ROM for short), a random access memory (RAM for short), a magnetic disk, or an optical disc.

It should be noted that the terms "include", "comprise", or any of their variants in this specification are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more restrictions, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially, or the part contributing to the prior art may be implemented in a form of a software product. The software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method for configured grant configuration, applied to a terminal and comprising:
   receiving radio resource control (RRC) signalling transmitted by a network-side device, wherein the RRC signalling is used to configure a mapping relationship between a plurality of sets of configured grant configurations and a plurality of indexes, wherein each index corresponds to one set of configured grant configurations, and each set of configured grant configurations comprises at least two configured grant configurations;
   receiving downlink control information (DCI) and determining, based on the mapping relationship, a set of configured grant configurations corresponding to a target index that is indicated by the DCI, wherein the target index is any one of the plurality of indexes; and
   deactivating configured grant configurations comprised in the set of configured grant configurations that is determined;
   wherein a quantity of bits N to be occupied by the target index is configured by the network-side device, and a value of N is configured by the network-side device by using the RRC signalling.

2. The method according to claim 1, wherein the determining, based on the mapping relationship, the set of configured grant configurations corresponding to the target index that is indicated by the DCI comprises:
   determining the set of configured grant configurations based on a target parameter of the DCI and the target index indicated by the DCI.

3. The method according to claim 2, wherein the target parameter of the DCI comprises at least one of the following:
   a format of the DCI;
   a radio network temporary identifier (RNTI) corresponding to the DCI;
   a control resource set corresponding to the DCI; or
   a search space corresponding to the DCI.

4. The method according to claim 1, wherein the method further comprises:
   determining a transmission occasion start position of each configured grant configuration in the set of configured grant configurations based on first indication information indicated by the DCI and first radio resource control (RRC) configuration information, wherein the first indication information is used to indicate a transmission occasion start position of a first configured grant configuration, and the first configured grant configuration is any one configuration in the set of configured grant configurations; and
   the first RRC configuration information is used to configure an offset value for transmission occasion start positions of the configured grant configurations in the set of configured grant configurations.

5. The method according to claim 1, wherein the method further comprises:
   determining a transmission occasion start position of each configured grant configuration in the set of configured grant configurations based on second RRC configuration information, first indication information indicated by the DCI, and second indication information indicated by the DCI; wherein
   the second RRC configuration information is used to configure an offset value set for transmission occasion start positions of the configured grant configurations in the set of configured grant configurations, and the offset value set comprises at least two offset values;
   the first indication information is used to indicate a transmission occasion start position of a first configured grant configuration, and the first configured grant configuration is any one configuration in the set of configured grant configurations; and
   the second indication information is used to indicate one offset value in the offset value set.

6. The method according to claim 1, wherein different configured grant configurations correspond to different demodulation reference signal (DMRS) parameters; and
   each DMRS parameter comprises at least one of the following:
   a DMRS port;
   an orthogonal mask (OCC) used for a DMRS port; or
   a DMRS scrambling identifier.

7. A non-transitory computer-readable storage medium, wherein a computer program is stored in the non-transitory computer-readable storage medium, the computer program is executed by a processor to implement the method for configured grant configuration according to claim 1.

8. The non-transitory computer-readable storage medium according to claim 7, wherein the computer program is further executed by a processor to implement:
   determining a transmission occasion start position of each configured grant configuration in the set of configured grant configurations based on first indication information indicated by the DCI and first radio resource control (RRC) configuration information, wherein
   the first indication information is used to indicate a transmission occasion start position of a first configured grant configuration, and the first configured grant configuration is any one configuration in the set of configured grant configurations; and
   the first RRC configuration information is used to configure an offset value for transmission occasion start positions of the configured grant configurations in the set of configured grant configurations.

9. The non-transitory computer-readable storage medium according to claim 7, wherein the computer program is further executed by a processor to implement:
   determining a transmission occasion start position of each configured grant configuration in the set of configured grant configurations based on second RRC configuration information, first indication information indicated by the DCI, and second indication information indicated by the DCI; wherein the second RRC configuration information is used to configure an offset value set for transmission occasion start positions of the configured grant configurations in the set of configured grant configurations, and the offset value set comprises at least two offset values;

the first indication information is used to indicate a transmission occasion start position of a first configured grant configuration, and the first configured grant configuration is any one configuration in the set of configured grant configurations; and the second indication information is used to indicate one offset value in the offset value set.

10. A terminal, comprising a processor, a memory, and a computer program stored in the memory and capable of running on the processor, wherein when the computer program is executed by the processor, the processor is configured to implement following steps:

receiving radio resource control (RRC) signalling transmitted by a network-side device, wherein the RRC signalling is used to configure a mapping relationship between a plurality of sets of configured grant configurations and a plurality of indexes, wherein each index corresponds to one set of configured grant configurations, and each set of configured grant configurations comprises at least two configured grant configurations;

receiving downlink control information (DCI) and determining, based on the mapping relationship, a set of configured grant configurations corresponding to a target index that is indicated by the DCI, wherein the target index is any one of the plurality of indexes; and deactivating configured grant configurations comprised in the set of configured grant configurations that is determined;

wherein a quantity of bits N to be occupied by the target index is configured by the network-side device, and a value of N is configured by the network-side device by using the RRC signalling.

11. The terminal according to claim 10, wherein the determining, based on the mapping relationship, the set of configured grant configurations corresponding to the target index that is indicated by the DCI comprises:

determining the set of configured grant configurations based on a target parameter of the DCI and the target index indicated by the DCI.

12. The terminal according to claim 11, wherein the target parameter of the DCI comprises at least one of the following:

a format of the DCI;
a radio network temporary identifier (RNTI) corresponding to the DCI;
a control resource set corresponding to the DCI; or
a search space corresponding to the DCI.

13. The terminal according to claim 10, wherein the processor is further configured to implement following step:

determining a transmission occasion start position of each configured grant configuration in the set of configured grant configurations based on first indication information indicated by the DCI and first radio resource control (RRC) configuration information, wherein the first indication information is used to indicate a transmission occasion start position of a first configured grant configuration, and the first configured grant configuration is any one configuration in the set of configured grant configurations; and the first RRC configuration information is used to configure an offset value for transmission occasion start positions of the configured grant configurations in the set of configured grant configurations.

14. The terminal according to claim 10, wherein the processor is further configured to implement following step:

determining a transmission occasion start position of each configured grant configuration in the set of configured grant configurations based on second RRC configuration information, first indication information indicated by the DCI, and second indication information indicated by the DCI; wherein the second RRC configuration information is used to configure an offset value set for transmission occasion start positions of the configured grant configurations in the set of configured grant configurations, and the offset value set comprises at least two offset values;

the first indication information is used to indicate a transmission occasion start position of a first configured grant configuration, and the first configured grant configuration is any one configuration in the set of configured grant configurations; and the second indication information is used to indicate one offset value in the offset value set.

15. The terminal according to claim 10, wherein different configured grant configurations correspond to different demodulation reference signal (DMRS) parameters; and each DMRS parameter comprises at least one of the following:
a DMRS port;
an orthogonal mask (OCC) used for a DMRS port; or
a DMRS scrambling identifier.

16. A network-side device, comprising a processor, a memory, and a computer program stored in the memory and capable of running on the processor, wherein when the computer program is executed by the processor, the processor is further configured to implement following steps:

transmitting radio resource control (RRC) signalling to a terminal, wherein the RRC signalling is used to configure a mapping relationship between a plurality of sets of configured grant configurations and a plurality of indexes, wherein each index corresponds to one set of configured grant configurations, and each set of configured grant configurations comprises at least two configured grant configurations; and transmitting downlink control information DCI to the terminal, wherein the DCI is used to indicate a target index, so that the terminal deactivates configured grant configurations comprised in the set of configured grant configurations and corresponding to the target index, wherein the target index is any one of the plurality of indexes;

wherein the processor is further configured to implement following step:

configuring a quantity of bits N to be occupied by the target index; wherein a value of N is configured by using the RRC signalling.

17. The network-side device according to claim 16, wherein in a case that the RRC signalling is used to configure at least two mapping relationships, different mapping relationships correspond to different target parameters of the DCI; and each target parameter of the DCI comprises at least one of the following:
a format of the DCI;
a radio network temporary identifier (RNTI) corresponding to the DCI;
a control resource set corresponding to the DCI; or
a search space corresponding to the DCI.

18. The network-side device according to claim 16, wherein the processor is further configured to implement following step:

configuring different demodulation reference signal (DMRS) parameters corresponding to different configured grant configurations, wherein each DMRS parameter comprises at least one of the following:

a DMRS port;

an orthogonal mask (OCC) used for a DMRS port; or a DMRS scrambling identifier.

* * * * *